United States Patent
Ye

(10) Patent No.: US 10,922,581 B2
(45) Date of Patent: Feb. 16, 2021

(54) METHOD, SYSTEM AND APPARATUS FOR PERFORMING RE-IDENTIFICATION IN IMAGES CAPTURED BY AT LEAST TWO CAMERA PAIRS OPERATING WITH DIFFERENT ENVIRONMENTAL FACTORS

(71) Applicant: CANON KABUSHIKI KAISHA, Tokyo (JP)

(72) Inventor: Getian Ye, Kogarah (AU)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 16/215,193

(22) Filed: Dec. 10, 2018

(65) Prior Publication Data

US 2020/0184256 A1   Jun. 11, 2020

(51) Int. Cl.
 *G06K 9/62*     (2006.01)
 *G06K 9/00*     (2006.01)
 *H04N 5/247*    (2006.01)

(52) U.S. Cl.
 CPC ....... *G06K 9/6215* (2013.01); *G06K 9/00369* (2013.01); *G06K 9/6223* (2013.01); *G06K 9/00771* (2013.01); *G06K 9/6256* (2013.01); *H04N 5/247* (2013.01)

(58) Field of Classification Search
 None
 See application file for complete search history.

(56) References Cited

U.S. PATENT DOCUMENTS

| | | | |
|---|---|---|---|
| 9,436,895 B1* | 9/2016 | Jones | G06N 3/0454 |
| 10,503,981 B2* | 12/2019 | Ye | G06K 9/00771 |
| 2012/0027288 A1* | 2/2012 | Yuan | G06T 7/001 |
| | | | 382/152 |
| 2014/0172625 A1* | 6/2014 | Reisman | G06Q 30/0631 |
| | | | 705/26.7 |
| 2016/0180196 A1* | 6/2016 | Taylor | G06K 9/6215 |
| | | | 382/103 |
| 2018/0037396 A1 | 2/2018 | Jacobs et al. | |
| 2018/0373962 A1* | 12/2018 | Ye | G06K 9/00369 |
| 2020/0184256 A1* | 6/2020 | Ye | G06K 9/6215 |

OTHER PUBLICATIONS

Sinno Jialin Pan, et al. "Domain Adaptation via Transfer Component Analysis", IEEE Transactions on Neural Networks, Feb. 2011, vol. 22, No. 2, pp. 199-210.

* cited by examiner

Primary Examiner — Tahmina N Ansari
(74) Attorney, Agent, or Firm — Canon U.S.A., Inc. IP Division

(57) ABSTRACT

A method of performing person re-identification for images captured by at least two camera pairs operating with different environmental factors. Descriptors representing characteristics of objects corresponding to a person in the images are clustered. A probability distribution of the clustered descriptors is determined. A coupling map for the images is determined based on the probability distribution. A cross-correlation between at least two of the coupling maps is determined. A similarity of the images captured by the camera pairs is determined according to the cross-correlation. Person re-identification is performed for the different environmental factors using the descriptors, based on the determined similarity.

14 Claims, 14 Drawing Sheets

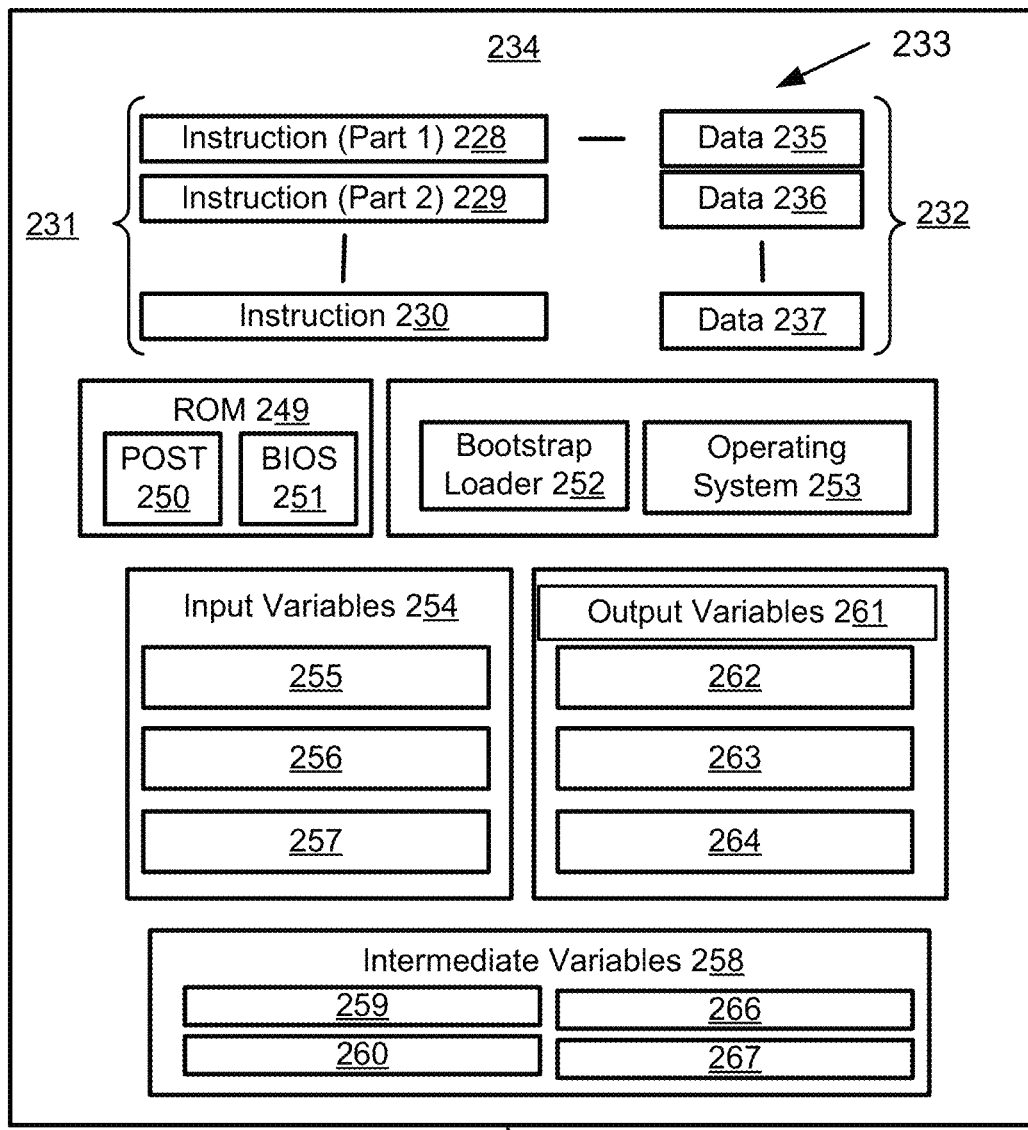
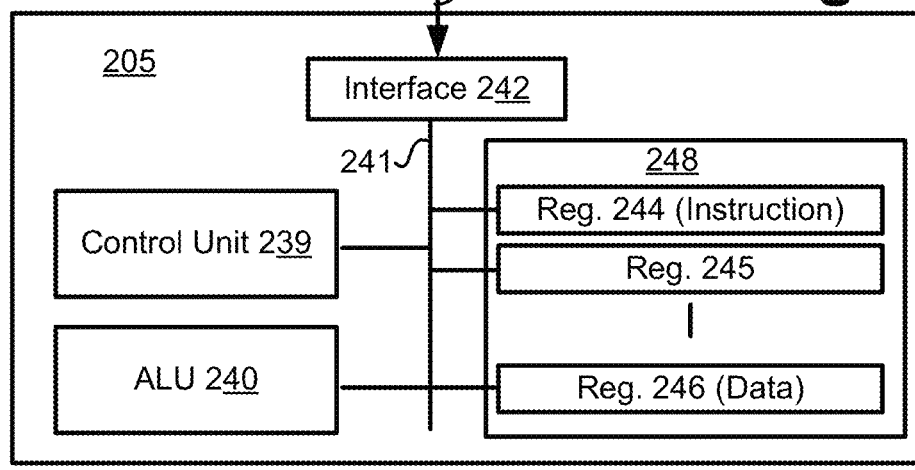
Fig. 2B

METHOD, SYSTEM AND APPARATUS FOR PERFORMING RE-IDENTIFICATION IN IMAGES CAPTURED BY AT LEAST TWO CAMERA PAIRS OPERATING WITH DIFFERENT ENVIRONMENTAL FACTORS

TECHNICAL FIELD

The present invention relates generally to image processing and, in particular, to matching objects between two captured images to determine whether a candidate object is an object of interest. The present invention also relates to a method, apparatus and system for performing person re-identification for images captured by at least two camera pairs, and to a computer program product including a computer readable medium having recorded thereon a computer program for performing person re-identification for images captured by at least two camera pairs.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view a video feed containing a particular suspicious person in order to identify undesirable activities. In another example from the business analytics domain, a shopping centre may wish to track customers across multiple cameras in order to build a profile of shopping habits.

Many surveillance applications require methods, known as "video analytics", to detect, track, match and analyse multiple objects of interest across multiple camera views. In one example, referred to as a "hand-off" application, object matching is used to persistently track multiple objects across first and second cameras with overlapping fields of view. In another example application, referred to as "re-identification", object matching is used to locate a specific object of interest across multiple cameras in the network with non-overlapping fields of view.

Cameras at different locations may have different viewing angles and work under different lighting conditions, such as indoor and outdoor. The different viewing angles and lighting conditions may cause the visual appearance of a person to change significantly between different camera views. In addition, a person may appear in a different orientation in different camera views, such as facing towards or away from the camera, depending on the placement of the camera relative to the flow of pedestrian traffic. Robust person re-identification in the presence of appearance change due to camera viewing angle, lighting and person orientation is difficult.

A person re-identification (ReID) model consists of an appearance descriptor extraction and a distance metric model. An appearance descriptor is a feature vector representing the appearance of a person. An appearance descriptor is a derived value or set of derived values determined from the pixel values in an image of a person. An appearance descriptor may be directly extracted from an image. One example of an appearance descriptor is a histogram of colour values. Another example of an appearance descriptor is a histogram of quantized image gradient responses. An appearance descriptor extractor may also be learned from a set of training images containing different persons using a supervised learning method or an unsupervised learning method. For example, a deep convolutional neural network may be learned in a supervised manner to separate training images based on the persons' identities. An appearance descriptor is then derived from one or more top layers of the learned deep neural network. A deep neural network may also be learned in an unsupervised manner to reconstruct input training images without any knowledge of persons' identities. An appearance descriptor is then derived from one or more top layers of the learned deep neural network.

Given a person's image in a camera view, a distance metric model may be used to determine the distances from the given image to a set of images in another camera view. The image with the smallest distance to the given image is considered as a closest match. The performance of person re-identification depends on the distance metric selected. General-purpose distance metrics, e.g., Euclidean distance and cosine distance, are commonly used by a distance metric model. A distance metric model may also be learned from a training dataset using a supervised learning method or an unsupervised method. In most known supervised and unsupervised learning methods, a projection is learned from appearance descriptors extracted from pairs of training images of people captured from a pair of cameras. In each pair of images, the first image is captured from the first camera and the second image is captured from the second camera. During the matching process, the learned projection is used to project appearance descriptors to a subspace and calculate the distances between the projected appearance descriptors. Supervised learning methods require training images to be labelled as "positive" or "negative" training images. Pairs of images of the same person are "positive" training images. Pairs of images of different persons are "negative" training images. Unsupervised learning methods do not require labelled training images. Supervised and unsupervised learning methods fail when the distribution of appearance descriptors corresponding to training images is vastly different from the distribution of appearance descriptors corresponding to testing images. The training images are referred to as source domain images and the testing images are referred to as target domain images. Further, the disparity in the distributions of appearance descriptors between the source and target domain is referred to as the domain shift problem. The degree of the disparity in the distributions is referred to as the domain gap. If the domain gap between the source and target domain is large, the domain similarity between the source and target domain is small and a person re-identification model learned on source domain images does not perform well on target domain images. For example,—a person re-identification model is learned on images captured from a pair of cameras in a shopping mall (indoor environment) and then used on images captured from a pair of cameras in a park (outdoor environment), the learned re-identification model will not perform well because the change in appearance in the images caused by the changes in lighting and other environmental conditions deteriorate the performance of the re-identification model.

If the domain gap between the source and target domain is large, the person re-identification model needs to be updated by using the training images collected from cameras in the target domain. To determine whether or not a person re-identification model needs to be updated when the model is deployed to a target domain, a domain gap measure that measures the domain similarity between the source and target domain is required. Given a target domain, a domain gap measure may also be used for selecting a re-identification model from a set of learned re-identification models, which has the highest domain similarity to the target domain. The selected re-identification model is more robust to the domain shift problem than the other re-identification models and the selected re-identification model can be directly deployed to the target domain without any update.

One known method for measuring the domain gap, known as "maximum mean discrepancy (MMD)", is to determine a distance between the arithmetic means of appearance descriptors from the source and target domain in a reproducing kernel Hilbert space. Maximum mean discrepancy is designed for dealing with the domain shift problem in image classification tasks. Maximum mean discrepancy cannot be directly used for a person re-identification task mainly because a person re-identification task involves images from two pairs of cameras, where one pair of cameras is from source domain and the other pair of cameras is from target domain.

SUMMARY

It is an object of the present invention to substantially overcome, or at least ameliorate, one or more disadvantages of existing arrangements.

Disclosed are arrangements relating to measuring the domain similarity between a source domain and a target domain by using images captured in the source and target domain.

According to one aspect of the present disclosure, there is provided a method of performing person re-identification for images captured by at least two camera pairs operating with different environmental factors, the method comprising:
  clustering descriptors representing characteristics of objects corresponding to a person in the images;
  determining a probability distribution of the clustered descriptors;
  determining a coupling map for the images based on the probability distribution;
  determining a cross-correlation between at least two of the coupling maps;
  determining a similarity of the images captured by the camera pairs according to the cross-correlation; and
  performing person re-identification for the different environmental factors using the descriptors, based on the determined similarity.

According to another aspect of the present disclosure, there is provided an apparatus for performing person re-identification for images captured by at least two camera pairs operating with different environmental factors, the apparatus comprising:
  means for clustering descriptors representing characteristics of objects corresponding to a person in the images;
  means for determining a probability distribution of the clustered descriptors;
  means for determining a coupling map for the images based on the probability distribution;
  means for determining a cross-correlation between at least two of the coupling maps;
  means for determining a similarity of the images captured by the camera pairs according to the cross-correlation; and
  means for performing person re-identification for the different environmental factors using the descriptors, based on the similarity.

According to still another aspect of the present disclosure, there is provided a system for performing person re-identification for images captured by at least two camera pairs operating with different environmental factors, the system comprising:
  a memory for storing data and a computer program;
  a processor coupled to the memory for executing the computer program, the computer program having instructions for:
    clustering descriptors representing characteristics of objects corresponding to a person in the images;
    determining a probability distribution of the clustered descriptors;
    determining a coupling map for the images based on the probability distribution;
    determining a cross-correlation between at least two of the coupling maps;
    determining a similarity of the images captured by the camera pairs according to the cross-correlation; and
    performing person re-identification for the different environmental factors using the descriptors, based on the similarity.

According to still another aspect of the present disclosure, there is provided a computer readable medium having stored on the medium a computer program for performing person re-identification for images captured by at least two camera pairs operating with different environmental factors, the program comprising:
  code for clustering descriptors representing characteristics of objects corresponding to a person in the images;
  code for determining a probability distribution of the clustered descriptors;
  code for determining a coupling map for the images based on the probability distribution;
  code for determining a cross-correlation between at least two of the coupling maps;
  code for determining a similarity of the images captured by the camera pairs according to the cross-correlation; and
  code for performing person re-identification for the different environmental factors using the descriptors, based on the similarity.

Other aspects are also disclosed.

BRIEF DESCRIPTION OF THE DRAWINGS

One or more embodiments of the invention will now be described with reference to the following drawings, in which:

FIGS. 2A and 2B form a schematic block diagram of the computer system of FIG. 1 upon which the arrangements described can be practiced;

DETAILED DESCRIPTION INCLUDING BEST MODE

Figure 1:
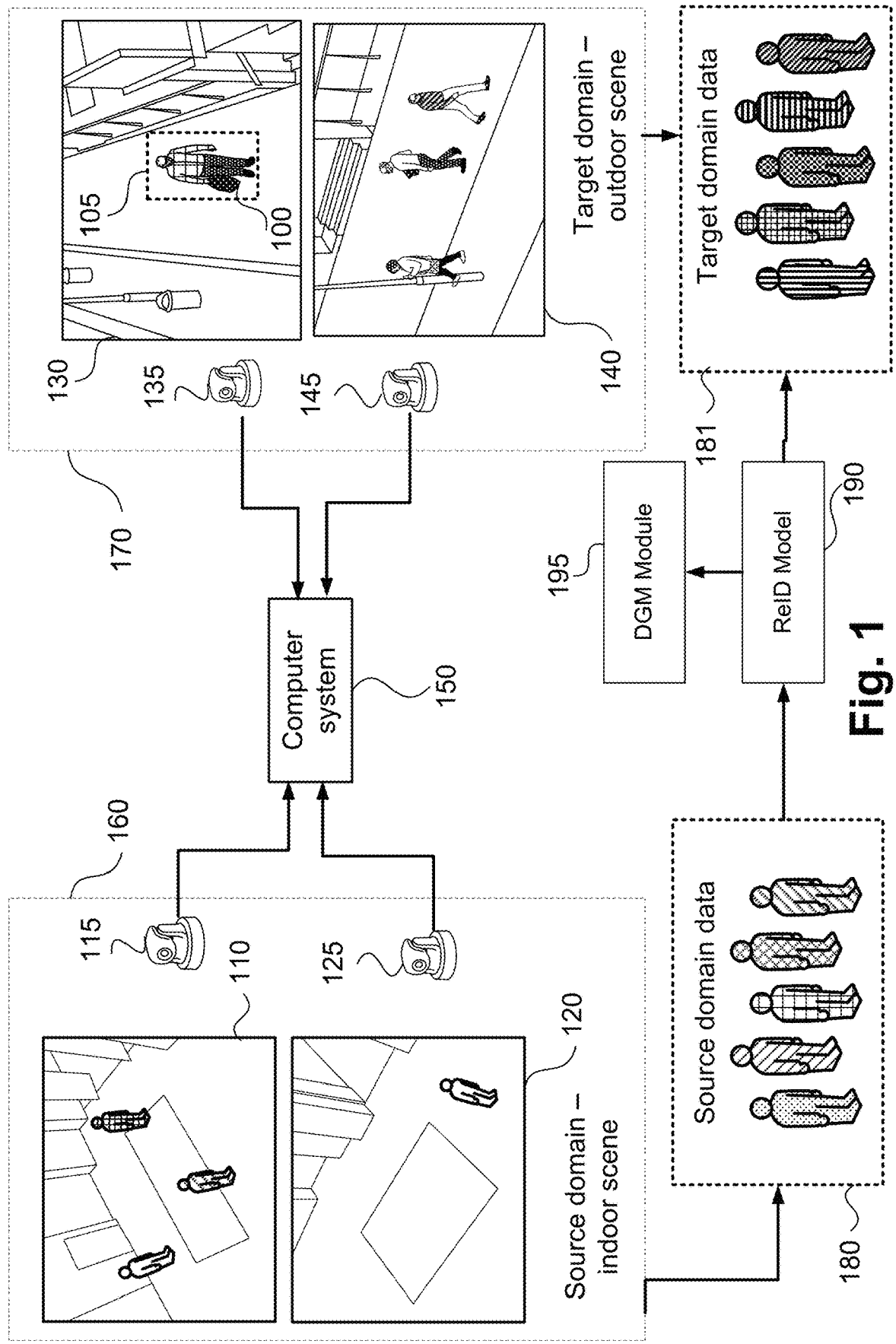
FIG. 1 shows a surveillance system comprising cameras connected to a computer system for analysing objects of interest, to which the arrangements may be applied.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as image 110 shown in FIG. 1, is made up of visual elements. The terms "pixel", "pixel location" and "image location" are used interchangeably throughout this specification to refer to one of the visual elements in a captured image. Each pixel of an image is described by one or more values characterising a property of the scene captured in the image. In one example, a single intensity value characterises the brightness of the scene at the pixel location. In another example, a triplet of values characterise the colour of the scene at the pixel location. Furthermore, a "region", "image region" or "cell" in an image refers to a collection of one or more spatially adjacent visual elements.

A "descriptor" or "feature" represents a derived value or set of derived values determined from the pixel values in an image region. One example of an appearance descriptor is a histogram of pixel colours and image gradients within predefined spatial cells of a rectified image. In one example, a feature is a histogram of colour values in the image region. In another example, a feature is an "edge" response value determined by determining an intensity gradient in the region. In yet another example, a feature is a filter response, such as a Gabor filter response, determined by the convolution of pixel values in the region with a filter kernel. Furthermore, a "feature map" assigns a feature value to each pixel in an image region. In one example, a feature map assigns an intensity value to each pixel in an image region. In another example, a feature map assigns a hue value to each pixel in an image region. In yet another example, a feature map assigns a Gabor filter response to each pixel in an image region. Finally, a "feature distribution" refers to the relative frequency of feature values in a feature map, normalized by the total number of feature values. In one arrangement, a feature distribution is a colour histogram (RGB, HSV etc.) as well as Histogram of gradients features. Another example of an appearance signature is a "bag-of-words" model of quantized keypoint descriptors.

A "bounding box" refers to a rectilinear image region enclosing an object in an image captured by a camera. Referring to FIG. 1, bounding box 105 encompasses the object of interest 100. In one arrangement, an operator of a surveillance system may define a bounding box 105 to express an intention to re-identify that object of interest in another image captured by another camera.

The term "foreground mask" refers to a binary image with non-zero values at pixel locations corresponding to an object of interest. A non-zero pixel location in a foreground mask is known as a "foreground pixel". The term "background pixel" refers to those pixels in an image (or within the corresponding bounding box) that are not foreground pixels. The set of "background pixels" in a "foreground mask" is the "scene". Referring to FIG. 1, the foreground mask corresponds to the image pixels of the person 100 within the bounding box 105.

As shown in FIG. 1, the digital cameras 115 and 125 communicate with a computer system 150. The arrangement of FIG. 1 may be applied to a range of applications. In one example, the computer system 150 allows a security guard to select an object of interest through an interactive user interface, and returns images of one or more candidate objects determined to be the object of interest. In another example, the computer system 150 automatically selects an object of interest and matches the object across multiple distributed cameras in order to analyse the long-term behaviour of the object.

The present description provides a method and system for determining a domain gap measure (DGM). Domain gap measure measures the domain similarity between two sets of images without any label information. Each set contains images captured at different times by two cameras within the same domain or images captured by two different camera pairs from two different domains (e.g., one pair from training or source domain and the other from a target domain). If domain gap measure determines a low domain similarity value, the domain gap is large and the person re=identification model trained on the source domain images may need to be updated using new training images from the target domain where the model will be deployed. In other words, the domain gap measure may determine if a person re-identification model is easily deployable or may need more training images from the target domain to improve performance of the person re-identification model.

FIG. 1 illustrates an example use case to which domain gap measure arrangements may be applied. In the example of FIG. 1, the domain similarity between the source domain 160 which is an indoor scene (e.g., an airport, shopping mall, hospital) and the target domain 170 which is an outdoor scene (e.g. a street), may be measured. In the example of FIG. 1, the indoor scene 160 has two cameras 115 and 125 which capture two non-overlapping viewpoints 110 and 120. The cameras 115 and 125 are connected to the computer system 150. While the example of FIG. 1 describes a scenario where the cameras 115 and 125 capture non-overlapping viewpoints 110 and 120, other arrangements are also possible. For example, in other arrangements, images of the object of interest and candidate objects are captured by different cameras simultaneously or at different times, or captured by the same camera at different times, including images that represent the same scene or different scenes, or multiple scenes with different candidate objects. In the example of FIG. 1, the person re-identification model 190 may be trained using images within source domain data 180 captured from the cameras 115 and 125 in the source domain 160. In one arrangement, the appearance descriptor in a person re-identification model 190 may be determined using a histogram of pixel colours and image gradients within predefined spatial cells of a rectified image. Another example of an appearance descriptor is a WHOS descriptor. The appearance descriptor extractor in the person re-identification model 190 may also be learned using a supervised learning method, e.g., a deep convolutional neural network, or an unsupervised learning method (e.g., an auto-encoder). In one arrangement, the distance metric model in the person re-identification model may be learned on labelled images pairs from the source domain dataset 180 using a supervised learning method (e.g, kernel local Fisher discriminant analysis), or an unsupervised learning method (e.g., dictionary learning).

After the person re-identification model 190 is trained, the person re-identification model 190 is deployed to the target domain 170 to match images in the target domain dataset 181 captured from cameras 135 and 145, which correspond to two non-overlapping viewpoints 130 and 140, respectively. The cameras 135 and 145 are connected to the computer system 150. Before deploying the person re-identification model 190 to the target domain outdoor scene 170, there is a need to determine the domain gap between the source domain 160 and the target domain 170 to determine whether the person re-identification model 190 performs well in the target domain 170. Domain gap measure (DGM) Module 195 measures the domain gap between the source domain indoor scene 160 and the target domain outdoor scene 170 using images from source domain data 180 and target domain data 181. The appearance descriptors of the images are extracted using the person re-identification model 190. A distribution of appearance descriptors extracted from images captured by each individual camera is determined. For example, the distribution of appearance descriptor from the camera 115 is determined using the images captured by the camera 115. Consequently, two distributions are generated for the camera 115 and 125 in the source domain. Another two distributions are generated for the camera 135 and 145 in the target domain. A coupling map between the two distributions of appearance descriptors from the camera 115 and 125 in the source domain, known as "source domain coupling map", is determined. In a similar manner, a coupling map between the two distributions of appearance descriptors from the camera 135 and 145 in the target domain, known as "target domain coupling map", is also determined. Then a cross correlation between the source domain coupling map and the target domain coupling map is determined. The cross correlation between the source and target domain coupling maps may be used as a domain gap measure to measure the domain similarity between the source domain 160 and the target domain 170. In one arrangement, a threshold may be used to determine whether two domains are similar. If the similarity value determined by the domain gap measure is smaller than the threshold, the source domain 160 and the target domain 170 are considered as dissimilar. Consequently, the person re-identification model 190 may need to be updated using additional target domain data 181.

Figure 2A:
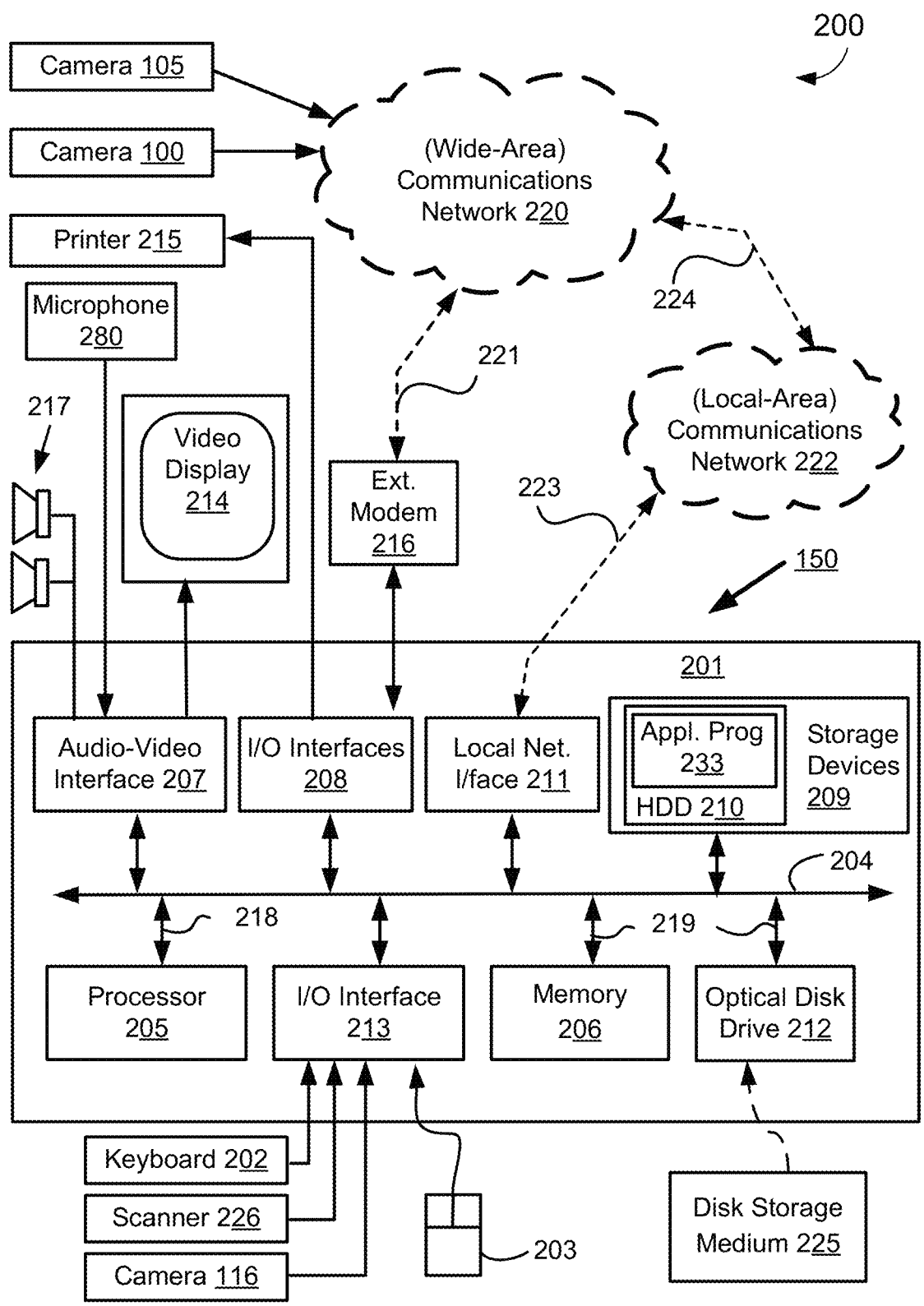

FIGS. 2A and 2B depict a general-purpose computer system 150, upon which the various arrangements described can be practiced.

As seen in FIG. 2A, the computer system 150 includes: a computer module 201; input devices such as a keyboard 202, a mouse pointer device 203, a scanner 226, one or more cameras such as the cameras 115 and 125, and a microphone 280; and output devices including a printer 215, a display device 214 and loudspeakers 217. An external Modulator-Demodulator (Modem) transceiver device 216 may be used by the computer module 201 for communicating to and from remote cameras such as 116 over a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 115 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 150 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 150.

The components 205 to 213 of the computer module 201 typically communicate via an interconnected bus 204 and in a manner that results in a conventional mode of operation of the computer system 150 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

Methods to be described may be implemented using the computer system 150 wherein the processes of FIGS. 3, 4, 5, 6 and 7 to be described, may be implemented as one or more software application programs 233 executable within the computer system 150. In particular, the steps of the described method are effected by instructions 231 (see FIG. 2B) in the software 233 that are carried out within the computer system 150. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software application programs 233 may be stored in a computer readable medium, including the storage devices described below, for example. The software is loaded into the computer system 150 from the computer readable medium, and then executed by the computer system 150. A computer readable medium having such software or computer program recorded on the computer readable medium is a computer program product. The use of the computer program product in the computer system 150 preferably effects an advantageous apparatus for implementing the described methods.

The software 233 is typically stored in the HDD 210 or the memory 206. The software is loaded into the computer system 150 from a computer readable medium, and executed by the computer system 150. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 150 preferably effects an apparatus for practicing the described arrangements.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 150 from other computer readable media. Computer readable storage media refers to any non-transitory tangible storage medium that provides recorded instructions and/or data to the computer system 150 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 150 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 150 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 150 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The described arrangements use input variables 254, which are stored in the memory 234 in corresponding memory locations 255, 256, 257. The described arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:
  a fetch operation, which fetches or reads an instruction 231 from a memory location 228, 229, 230;
  a decode operation in which the control unit 239 determines which instruction has been fetched; and
  an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 3, 4, 5, 6 and 7 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The described methods may alternatively be implemented in dedicated hardware such as one or more integrated circuits performing the functions or sub functions. Such dedicated hardware may include graphic processors, digital signal processors, or one or more microprocessors and associated memories, and may reside on platforms such as video cameras.

Figure 3:
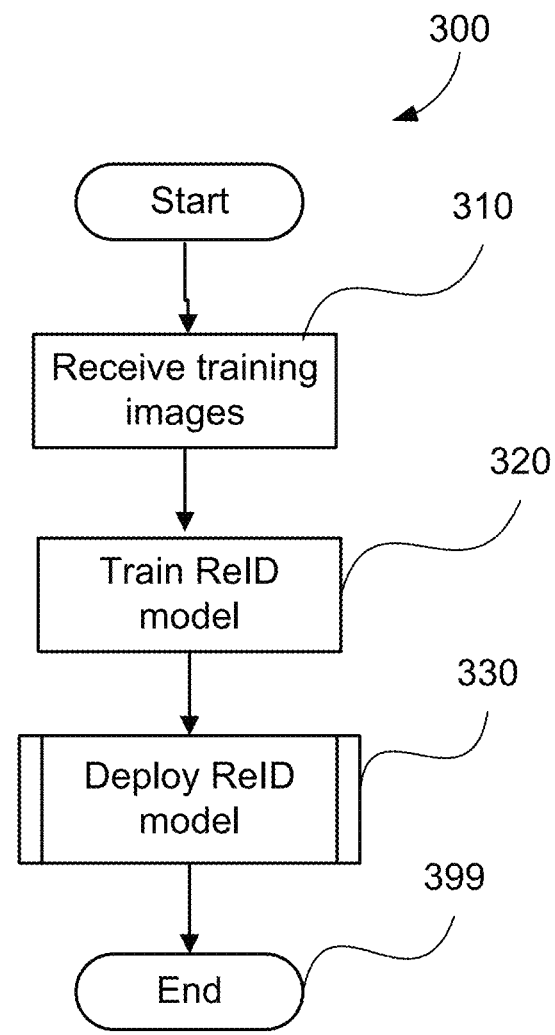
FIG. 3 is a schematic flow diagram showing a method of training a person re-identification (ReID) model for matching objects between a query image and a gallery image and deploying the person re-identification model for use in a target domain according to one arrangement.

FIG. 3 shows a method 300 of training a person re-identification (ReID) Model 190 using source domain data and deploying the learned person re-identification Model 190 to a target domain which may be different from the source domain. The method 300 may be implemented as one or more software code modules of the software application program 233 resident in the hard disk drive 210 and being controlled in its execution by the processor 205.

Figure 4:
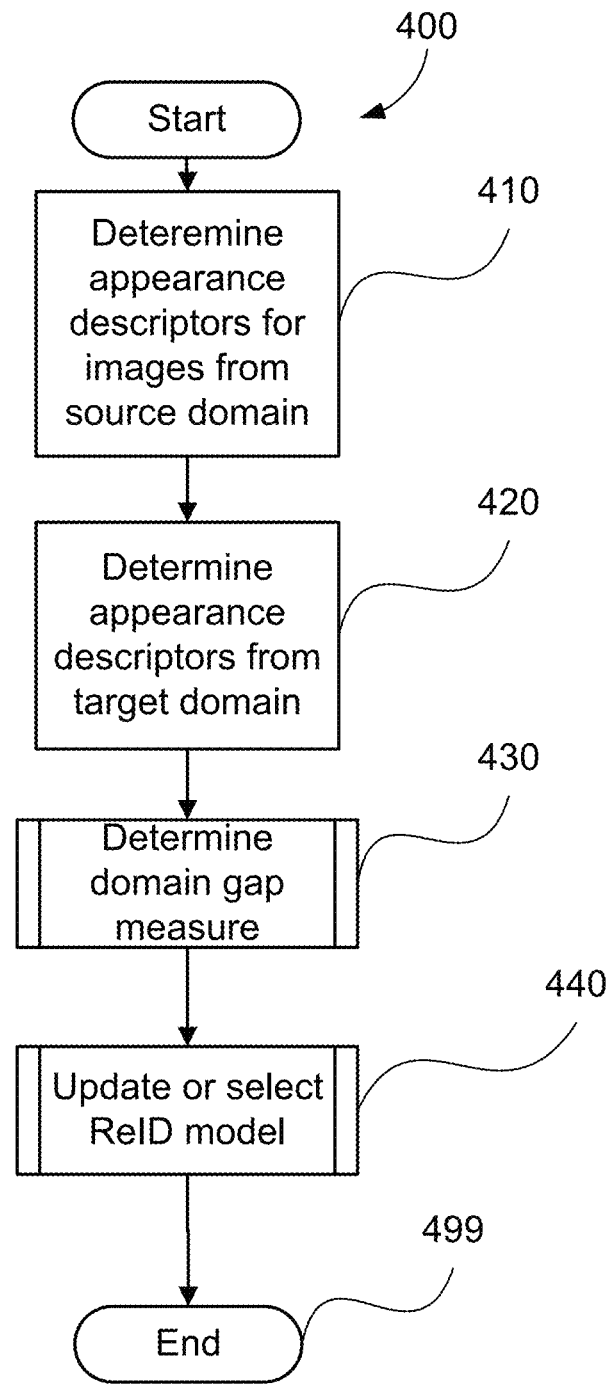
FIG. 4 is a schematic flow diagram showing a method of deploying a person re-identification model according to one arrangement.

FIG. 4 shows a method 400 of deploying a person re-identification model by determining a domain gap between a source domain and a target domain according to one arrangement. In one example, the method 400 is used to select the most appropriate person re-identification model for a target domain or update an existing person re-identification model to work well in the target domain so that the updated/selected person re-identification model may be used to match images of persons for performing person re-identification. The method 400 may be implemented as one or more software code modules of the software application program 233 resident in the hard disk drive 210 and being controlled in its execution by the processor 205.

Figure 5:
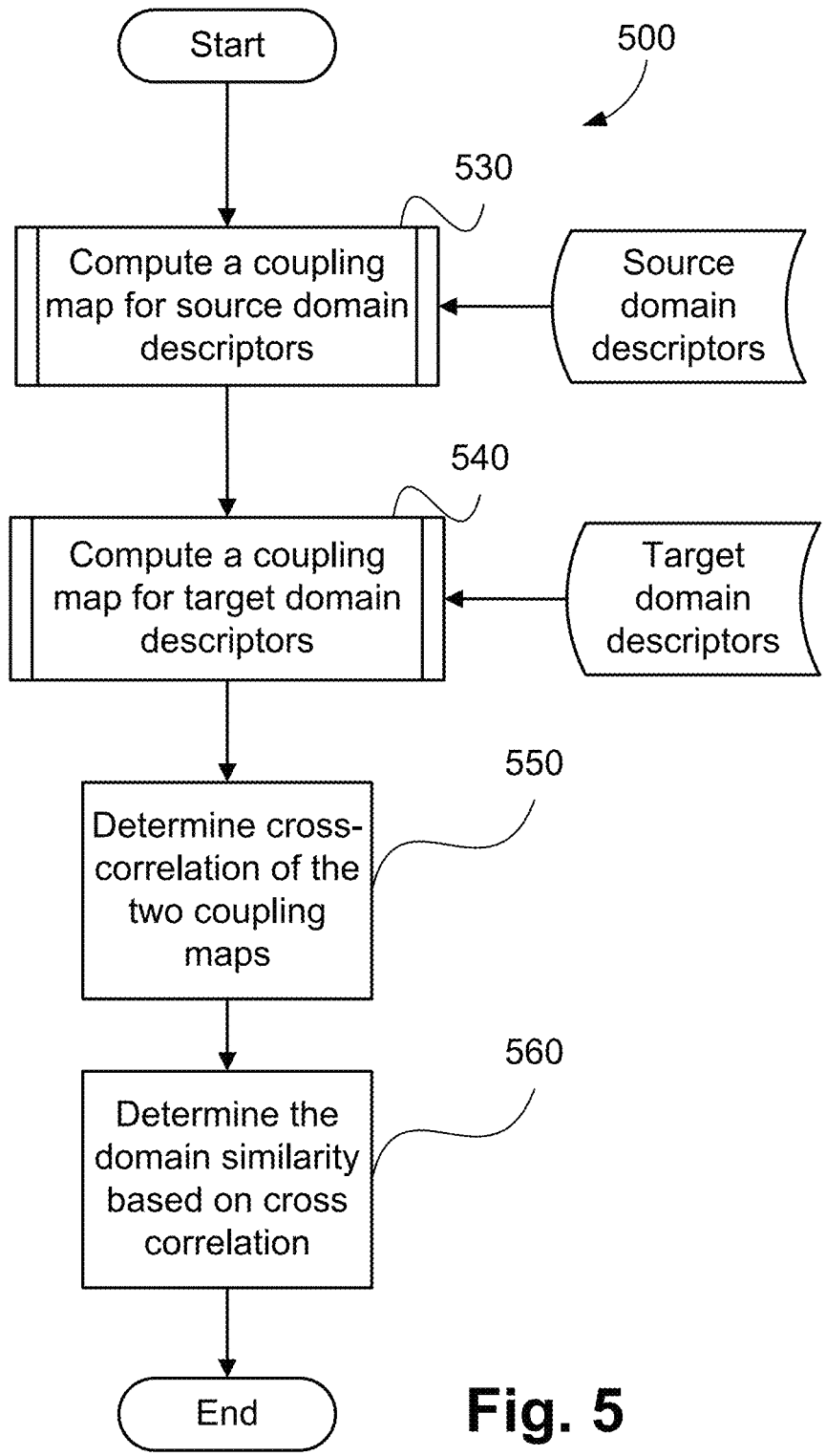
FIG. 5 is a schematic flow diagram of a method of determining domain gap measure according to one arrangement.

FIG. 5 shows a method 500 of determining domain gap measure, according to one arrangement. The method 500 may be implemented as one or more software code modules of the software application program 233 resident in the hard disk drive 210 and being controlled in its execution by the processor 205.

Figure 6:
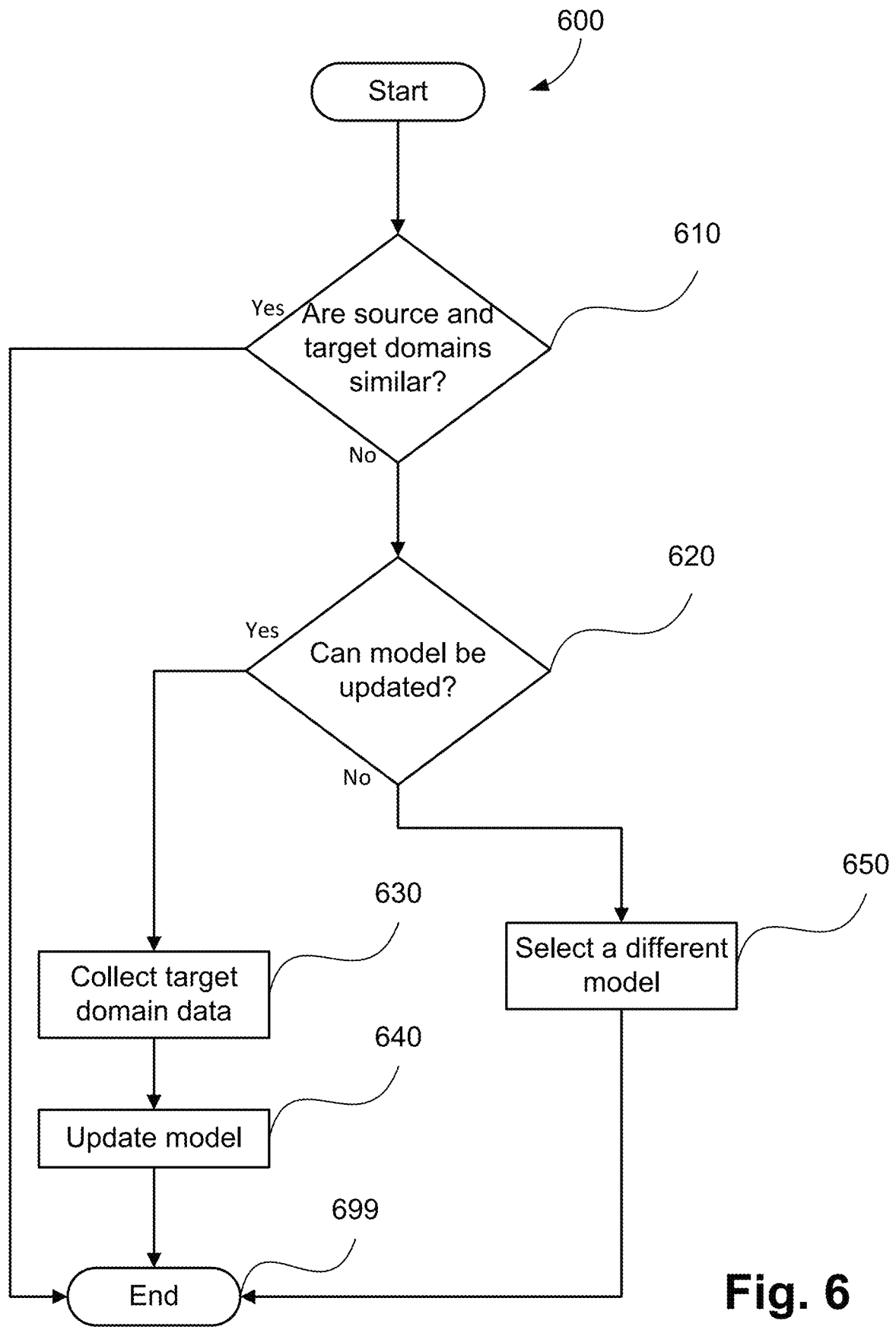
FIG. 6 is a schematic flow diagram of a method of updating a learned person re-identification model based on the domain gap measure determined in FIG. 4 according to one arrangement.
Figure 7:
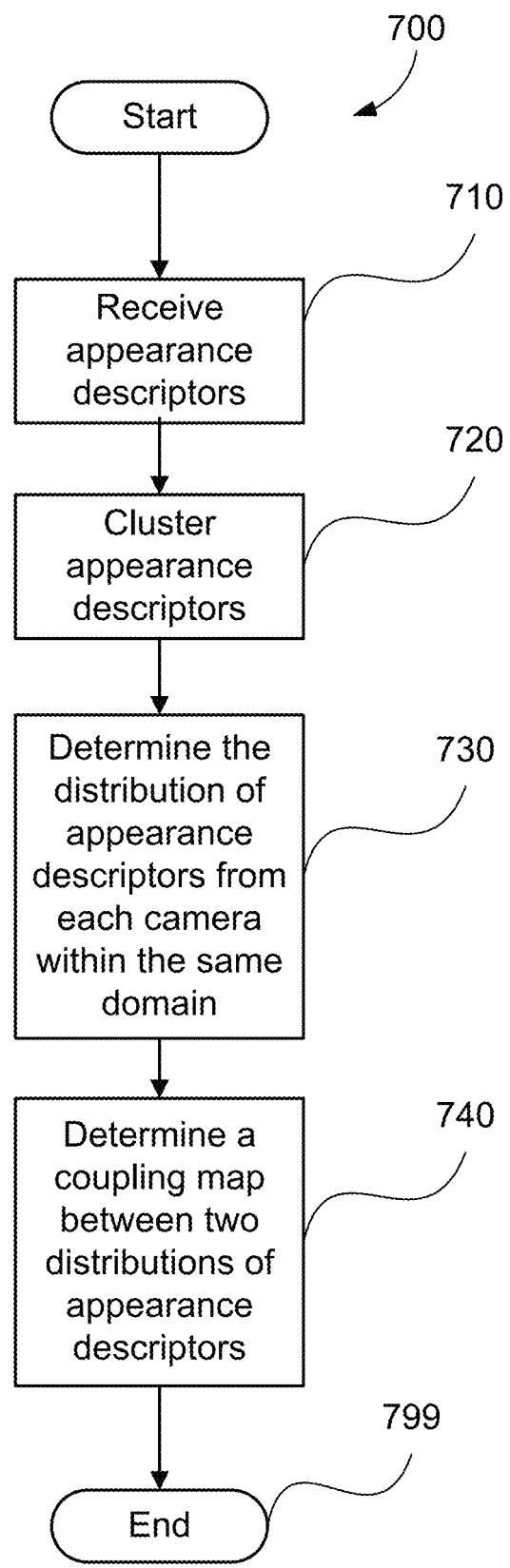
FIG. 7 is a schematic flow diagram of a method of determining a coupling map according to one arrangement.

FIG. 6 shows a method 600 of selecting or updating a person re-identification model based on the domain gap measure, according to one arrangement. In one example, the model selection method 500 may check the domain gap measurement against a pre-defined threshold and determine whether the person re-identification model needs to be updated or a suitable person re-identification model can be selected. The method 600 may be implemented as one or more software code modules of the software application program 233 resident in the hard disk drive 210 and being controlled in its execution by the processor 205. FIG. 7 shows a method 700 of determining a coupling map between two distributions of appearance descriptors from two cameras in the same domain. In arrangement, a coupling map may be determined using Earth Mover's distance. The method 700 may be implemented as one or more software code modules of the software application program 233 resident in the hard disk drive 210 and being controlled in its execution by the processor 205.

The method 300 starts at receiving step 310, where pairs of training images are received by the system 150 from a source domain, under execution of the processor 205, and may be stored in the memory 206. Referring to FIG. 1, the training image pairs are selected from source domain data 180, which are collected from the camera 115 and 125 in the source domain 160. Then the method 300 proceeds to training step 320. At step 320, a person re-identification model is trained, under execution of the processor 205, using the training images input at step 310. The person re-identification model consists of an appearance descriptor extractor and a distance metric model. In one arrangement, WHOS descriptors or colour histogram descriptors are extracted from training images. The WHOS descriptors are then used to train a distance metric model by using a supervised learning method (e.g., kernel local Fisher discriminant analysis), or an unsupervised learning method (e.g., dictionary learning). In another arrangement, the appearance descriptor extractor is learned from training images by using a supervised learning method (e.g., a deep convolutional neural network), or an unsupervised learning method (e.g., an auto-encoder). The appearance descriptors are then directly used to train a distance metric model by using a supervised learning method (e.g., kernel local Fisher discriminant analysis), or an unsupervised learning method (e.g., dictionary learning). A distance metric model may also be created by selecting a general-purpose distance metrics (e.g., Euclidean distance and cosine distance), without any learning process.

The method 300, after determining the person re-identification model 190 at step 320 using either supervised or unsupervised learning methods, then proceeds to applying step 330. At step 330, the person re-identification model 190 is deployed to a target domain 170, under execution of the processor 205, based on the domain gap measure. The details of the deployment of the model 190 is described in detail in the flow diagram 400 of FIG. 4. After step 340, the method 300 concludes.

Figure 12:
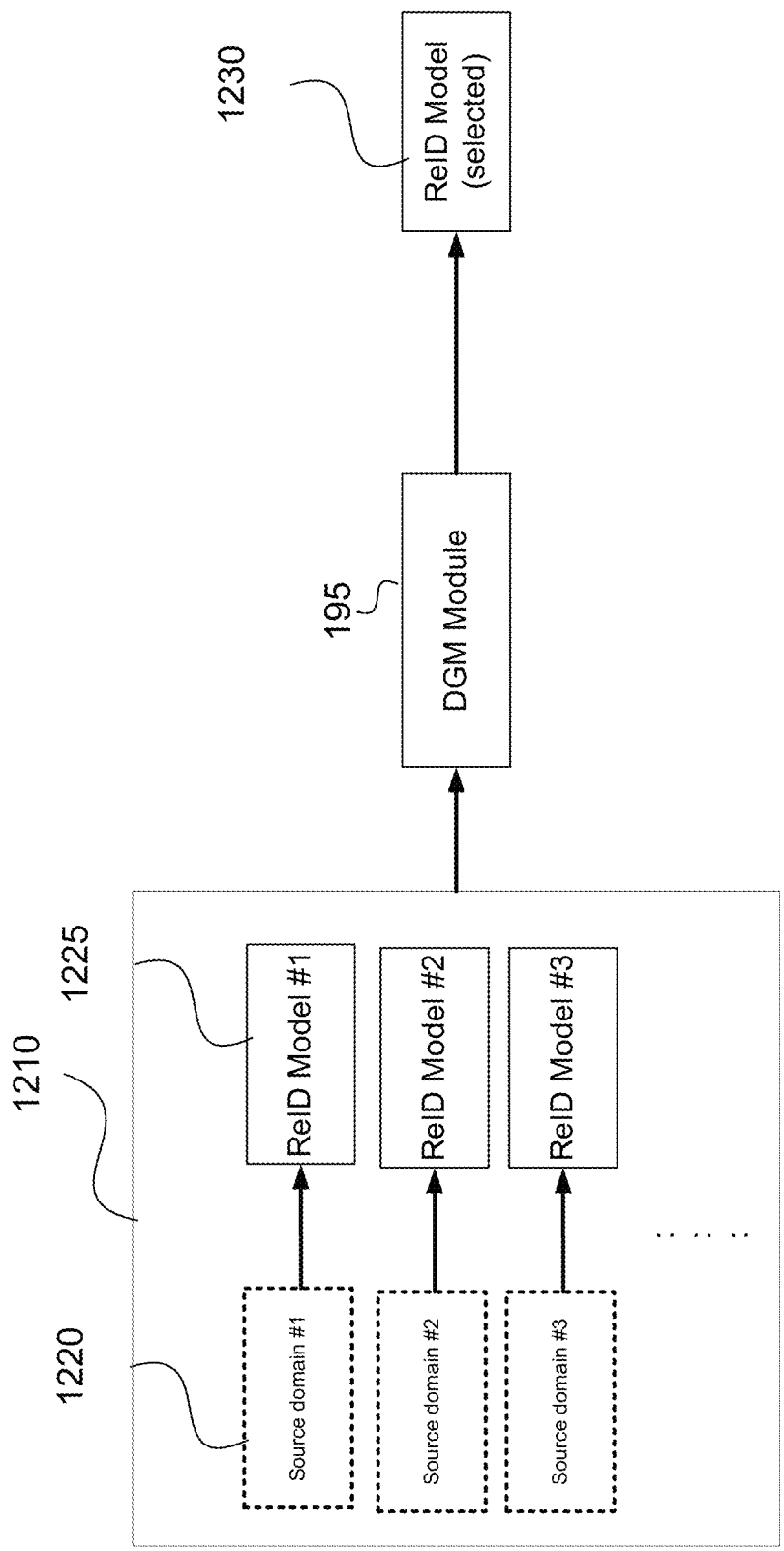
FIG. 12 shows an example of selecting a person re-identification model from a set of person re-identification models for a target domain using the domain gap module according to one arrangement.

In the arrangement of the method 300, a single person re-identification model 190 is determined based on source domain data 180. In another arrangement, numerous person re-identification models may be trained by using training datasets collected from different source domains. For example, referring to FIG. 12, person re-identification model #1 1225, may be trained using source domain data #1 1220 collected from an airport. Other source domain data may be collected from a hospital, a shopping mall, or a train station, etc. In another arrangement, numerous person re-identification models may be trained on a training dataset collected from a single source domain or multiple source domains by using different machine learning methods. Again, referring back to FIG. 12, a set of person re-identification models 1210 are available to be deployed to a target domain 170. In one arrangement, the DGM Module 195 selects a person re-identification model 1230 from a set of person re-identification models 1210 based on a domain gap measure.

The method 400 starts at extracting step 410, where appearance descriptors are extracted from images 180 collected from the camera 115 and 125 in the source domain 160 using an appearance descriptor extractor in the person re-identification model 190 determined at step 320 of method 300. The appearance descriptors extracted from images 180 may be stored in the memory 206 under execution of the processor 205. In one arrangement, WHOS appearance descriptor extractor is used to determine appearance descriptors from source domain 160. In another arrangement, the appearance descriptor extractor learned from source domain data is used to determine the appearance descriptors from source domain 160.

Then the method 400 proceeds to extracting step 420. At step 420, appearance descriptors are extracted from images 181 collected from the camera 135 and 145 in the target domain 170 using an appearance descriptor extractor in the person re-identification model 190 determined at step 320 of the method 300. The appearance descriptors extracted from images 181 may be stored in the memory 206 under execution of the processor 205. The appearance descriptors determined at step 420 use the same algorithm as step 410.

Then the method 400 proceeds to determining step 430 where a domain gap measure is determined between the source domain 160 and the target domain 170 according to the appearance descriptors determined at step 410 and step 420 using the person re-identification model 190. The domain gap measurement is determined in accordance with the method 500 which will be described in detail below with reference to FIG. 5.

After step 430, the method 400 proceeds to determining step 440 where the method 400 determines whether the person re-identification model 190 requires to be updated or an appropriate person re-identification model requires to be selected based on the domain gap measurement determined at step 430. Step 440 will be further described below with reference to FIG. 5. After step 440, the method 400 concludes.

The method 500 starts at determining step 530, where a coupling map $C_1$ is determined, under execution of the processor 205, using appearance descriptors of images from source domain data 180. The coupling map is determined at step 530 in accordance with the method 700 which will be described in detail below with reference to FIG. 7. Then the method 500 proceeds to determining step 540. At step 540, a coupling map $C_2$ is determined in a similar manner to the step 530 using appearance descriptors of images from the target domain data 181. Then the method 500 proceeds to determining step 550 where a cross-correlation between the two coupling maps $C_1$ and $C_2$ is determined at steps 530 and 540, respectively, is determined according to Equation (1), below:

$$\text{corr} = \frac{1}{MN} \frac{\sum_{i,j} C_1(i,j) \cdot C_2(i,j)}{\sigma(C_1) \cdot \sigma(C_2)} \quad (1)$$

where $C_1(i,j)$ and $C_2(i,j)$ represent the values at the entry $(i,j)$ of the coupling map $C_1$ and $C_2$, respectively. The number of rows or columns of each coupling map are denoted by M and N. The standard deviations of the coupling map $C_1(i,j)$ and $C_2(i,j)$ are represented by $\sigma(C_1)$ and $\sigma(C_2)$, respectively.

Then the method 500 proceeds to determining step 560, where a domain similarity is determined, under execution of the processor 205, based on the cross correlation value determined at step 550. In one arrangement, the correlation score is used as a domain similarity measurement. The correlation value is a positive number between zero (0) and one (1). A small correlation value (e.g., 0.06) indicates that the domain similarity between the source domain 160 and the target domain 170 is low. Therefore, a person re-identification model 190, which is learned on source domain data 180, may not perform well on the target domain data 181. In another arrangement, the correlation score is used to select a person re-identification model from a set of person re-identification models shown in FIG. 12. The selected person re-identification model is more robust against domain shift problems than other re-identification models.

The method 600 starts at comparing step 610, where if the target domain 170 is similar to the source domain 160, then the method 600 concludes. Otherwise, the method 600 proceeds to step 620. The comparison is made at step 610 based on the domain similarity value determined in accordance with the method 500 described in FIG. 5.

At comparing step 610, the domain similarity value is compared against a pre-determined threshold value, under execution of the processor 205. If the domain similarity value is greater than the pre-determined threshold, then the method 600 concludes. Otherwise, if the domain similarity value is less than the predetermined threshold value, then the method 600 proceeds to step 620. The threshold used at step 620 may be selected to be a numerical value between zero (0) and one (1) (e.g., 0.3). The threshold may also be determined based on the domain similarity between two source domains that have similar characteristics. For example, if the domain similarity value between two source domains is 0.8, then the threshold may be selected to be a fraction of the domain similarity value (e.g., 20%). In one arrangement, the data for the two source domains may be determined by dividing the source domain data 180 into two subsets. The two subset are used as two source domain datasets. The method 500 is then performed on the two subsets to compute the domain similarity between the two subsets.

At determining step 620, the method 600 determines if the person re-identification model 190 can be updated using target domain data 181 to improve performance of the model 190. In one arrangement, determining whether a person re-identification model 190 can be updated is based on the availability of target domain data 181, the amount of target domain data 181 needed and the time needed to update the person re-identification model 191. If the target domain data 181 is not available or the amount of target domain data is not sufficient, then the method 600 proceeds to determining step 650. Otherwise, if the target domain data 181 is available, then the method 600 proceeds to collecting step 630.

At step 650, the domain gap measure is determined for all available person re-identification models 1210 and the person re-identification models are ranked in a decreasing order based on the domain similarity score determined in accordance with the method 500. The ranked person re-identification models may be stored in a list in the memory 206 under execution of the processor 205.

From the ranked list of person re-identification models, a top ranked person re-identification model 1230 is selected provided that the domain similarity score of the top ranked person re-identification model 1230 is greater than the predetermined threshold. In one arrangement, several person re-identification models 1210 are trained using source domain data with different characteristics. In one arrangement the characteristics may be based on environmental factors such as sunny day, cloudy day, day time, night time, rainy conditions etc. In another arrangement, the characteristics may be based on location such as indoors, outdoors, type of locations like shopping malls, airports etc. In one arrangement, a large set of such person re-identification models may be available for being deployed to a target domain 170. By matching the environmental factors or other factors associated with the source and target domains, a subset of person re-identification models 1210 trained on different source domain data may be selected and evaluated using the domain gap measure.

At collecting step 630, labelled or unlabelled training images are collected, under execution of the processor 205, depending on whether the person-re-identification model 190 is updated using a supervised learning method or an unsupervised learning method, respectively. The labelled or unlabelled training images are collected at step 630 from the target domain data 181. Then the method 600 proceeds to step 640. At step 640, the person re-identification model 190 is updated using the training images collected at step 630. In one arrangement, if the person re-identification model is trained using a deep convolutional neural network, then the labelled training images from the target domain are used to refine the deep convolutional neural network. In another arrangement, if the person re-identification model is a dictionary learnt using "dictionary learning", then unlabelled training images from the target domain may be used to update the dictionary. After step 640, the method 600 concludes.

Referring back to FIG. 6 again, online update of re-identification model 190 is described through the steps 630 and 640. In another arrangement, the online update of the person re-identification model 190 based on the target domain data 181 may be performed in a loop such that the model 190 is updated until the source and target domains are similar according to the domain gap measure. For example, in one arrangement, after updating the person re-identification model 190 at step 640, the method 400 may be repeated on the updated re-identification model.

Figure 9:
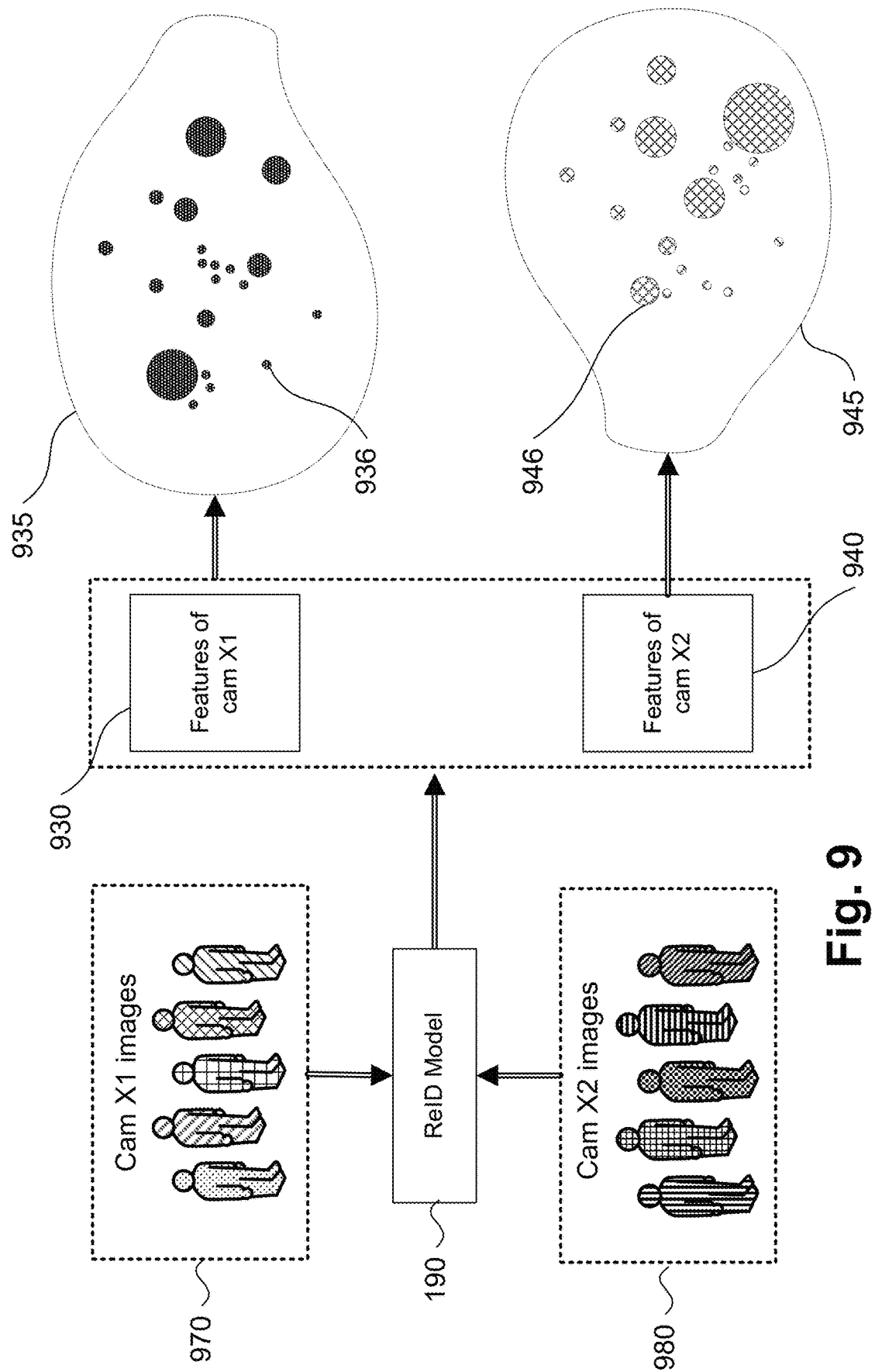
FIG. 9 is an illustration of determining clusters of appearance descriptors based on person images captured from cameras according to one arrangement.
Figure 10:
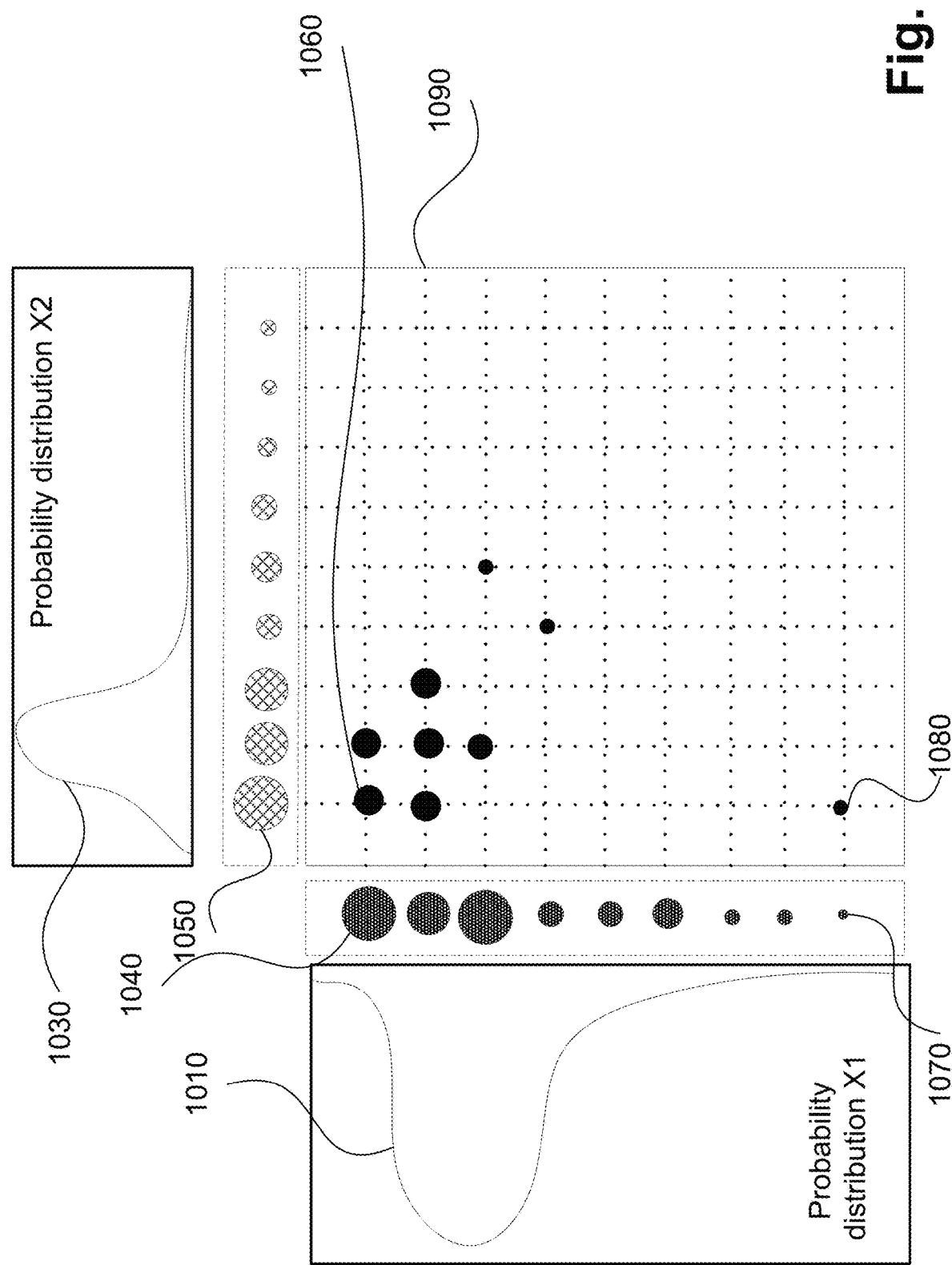
FIG. 10 shows an example of a coupling map between two distributions of appearance descriptors from two different cameras according to one arrangement.

The method 700 of FIG. 7 will now be described by way of example with reference to FIGS. 8, 9 and 10. The method 700 starts at receiving step 710, where appearance descriptors of person images from either source domain data 180 or target domain data 181 are received by the computer system 150, under execution of the processor 205. The appearance descriptors received at step 710 may be stored in the memory 206. The method of determining the coupling map is the same regardless of the origin of the person images.

The method 700 then proceeds to clustering step 720. At step 720, the appearance descriptors input at step 710 are clustered using any suitable clustering method such as K-Means. Referring to FIG. 9, Cam X1 images 970 (i.e., images captured by a camera X1) and Cam X2 images 980 (i.e., images captured by a camera X2) are images selected from either the source domain data 180 or the target domain data 181. The appearance descriptors of a person's features of Cam X1 930 are extracted from Cam X1 images 970 using the person re-identification model 190. Similarly, the appearance descriptors Features of Cam X2 940 are extracted from Cam X2 images 980 using the same person re-identification model 190. In one arrangement, the appearance descriptors 930 and 940 are clustered together to find common cluster centres. In another arrangement, the K-Means algorithm is performed on features of cam X1 930 and features of cam X2 940 separately to determine clusters in their own individual feature spaces. Whether the clusters are determined in a common space or individual spaces, the K-Means algorithm determines the distribution of appearance descriptors from the two cameras X1 and X2. In one arrangement, the cameras X1 and X2 may correspond to cameras 115 and 125 capturing the viewpoints in the source domain 160. In another arrangement, the cameras X1 and X2 may correspond to cameras 135 and 145 capturing viewpoints in the target domain 170.

Figure 13:
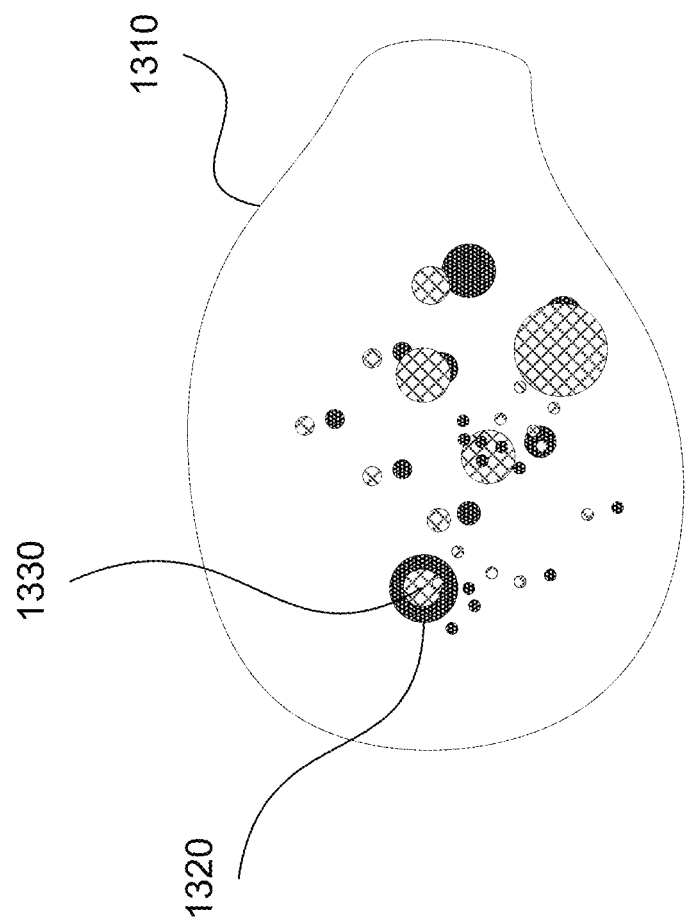
FIG. 13 shows an example of cluster centres determined by clustering appearance descriptors according to one arrangement.

Referring back to FIGS. 9, 935 and 945 refer to clusters of appearance descriptors based on features of camera X1 930 and features of camera X2 940 respectively. The individual clusters of appearance descriptors are shown in FIG. 9 as circles in different sizes. The size of the circle is indicative of the size of each cluster which is merely the number of appearance descriptors that belong to that cluster. In FIG. 9, 946 refers to a cluster determined from features of camera X2 940 and 936 refers to a cluster determined from features of camera X1 930. Further, in FIG. 9, the set of clusters 935 and 945 are shown to be represented in their own separate sub-spaces. In another arrangement, the clusters may be formed in a common space as illustrated in FIG. 13. Referring to FIG. 13, 1310 represents the common space where common clusters are determined. In the example of FIG. 13, cluster 1330 belonging to features of camera X1 930 and cluster 1320 belonging to features of camera X2 940 share the same cluster centre.

After step 720, the method 700 proceeds to determining step 730 where a probability distribution of the features 930 and 940 are determined under execution of the processor 205. The probability distribution determined at step 730 directly follows from the output of K-Means clustering of feature descriptors as described in the examples 935, 945 or 1310. Referring to FIGS. 10, 1030 and 1010 show probability distributions of features of camera X2 940 and Features of camera X1 930. In one arrangement, the probability distribution 1030 is a histogram which plots the normalized frequency (i.e., average number of elements in a particular cluster) against the centroid of the cluster (also known as bin centre). Referring to FIG. 13, if the K-means clustering is used to determine common clusters based of Features of camera X1 930 and Features of camera X2 940, then the probability distributions 1010 and 1030 share common cluster centres but different distributions depending on contribution of each of the cameras X1 and X2 to the common cluster centre.

After step 730, the method 700 proceeds to determining step 740 where a coupling map of the two distributions are determined under execution of the processor 205. The determination of a coupling map at step 730 will be described with respect to FIGS. 8A, 8B, 8C and 10. At step 730, a coupling map between the two distributions of features 1010 and 1030 is determined using a Wasserstein distance metric (e.g., Earth Mover's distance), in one arrangement. Then at transforming step 740, the probability distribution 1010 is transformed to resemble the probability distribution 1030 using the Wasserstein distance metric. The coupling map is determined from the transformation process. The transformation of the probability distribution as at step 740 will now be described with reference to FIGS. 8A, 8B and 8C.

Figure 8A:
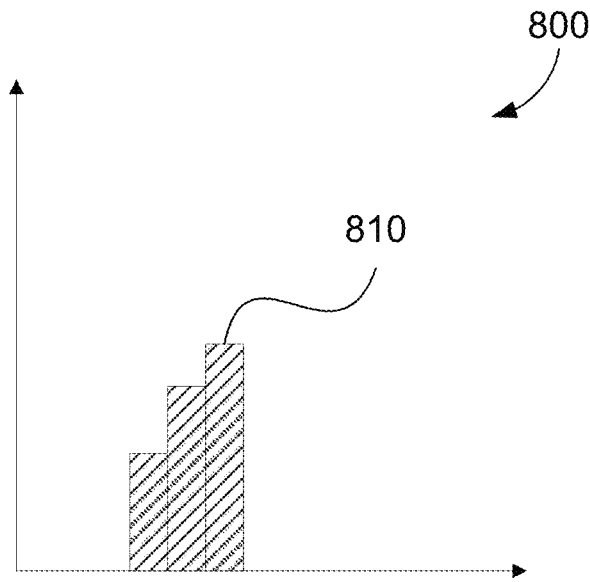
FIG. 8A shows an example feature distribution.
Figure 8B:
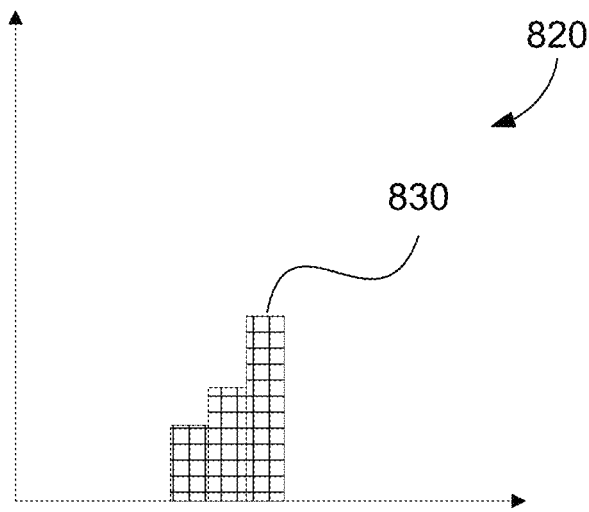
FIG. 8B shows an example feature distribution.
Figure 8C:
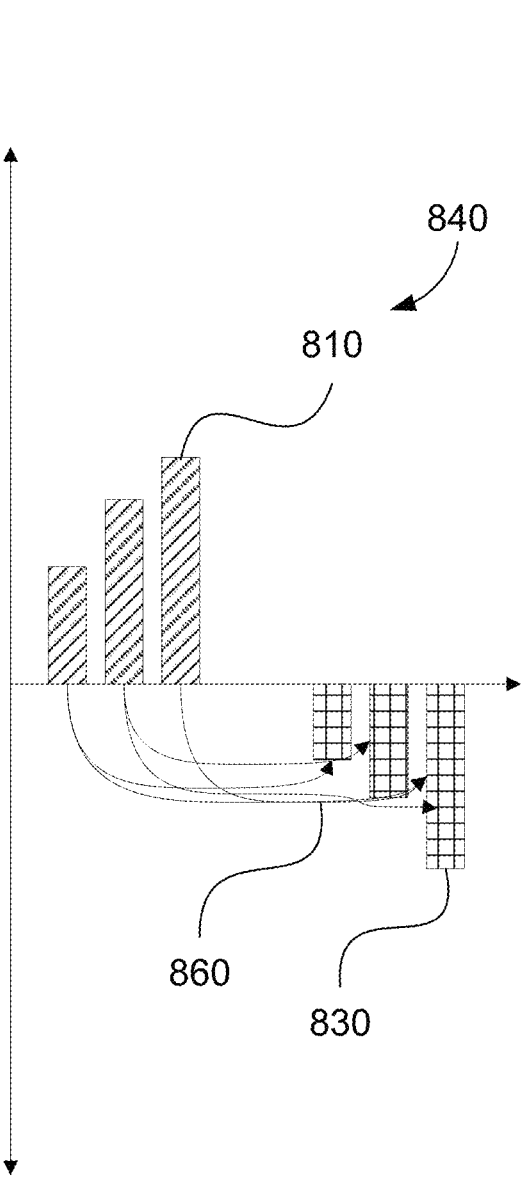
FIG. 8C shows the transformation of feature distribution of FIG. 8A into a feature distribution of FIG. 8B.

FIGS. 8A, 8B and 8C show an example of transforming probability distribution 800 shown in FIG. 8A to resemble probability distribution 820 in one arrangement. FIG. 8A shows a bin 810 within distribution 800. FIG. 8B shows a bin 830 within distribution 820. The two bins 810 and 830 represent particular clusters such as 1320 and 1330 in one arrangement. The bin value of each bin, also known as "earth", represents the average number of appearance descriptors clustered into the bin or the cluster centre. As shown in FIG. 8C, one of the distributions 800 can be thought of as a set of hills and other distribution 820 as set of valleys. A transformation may be performed, as at step 740, to move earth from hills to valleys to flatten both distributions 800 and 820 to be at the same level with minimum cost. The cost is comprised of distance between two bins (e.g., 810 and 830), and the amount of earth needed to be moved from one bin (e.g., 810) to the other bin 830. Arrow 860 connecting the bin 810 to bin 830 represents moving earth from the bin 810 to the bin 830. Thus, at step 740, the transformation that makes the probability distribution 1010 resemble the probability distribution 1030 is determined by minimizing the cost of moving earth using an optimisation method (e.g., linear programming). A coupling map may be determined based on the determined transformation. FIG. 10 shows a coupling map 1090 where rows correspond to cluster centres or bins of feature distribution 1010 and columns correspond to cluster centres or bins of feature distribution 1030. Each entry of the coupling map 1090 represents the amount of earth needed to be moved between a cluster centre of one distribution and cluster centres of the other distribution. As an example, solid black circle 1060 in the coupling map 1090 represents the amount of earth moved between cluster centre 1040 of the distribution 1010 and cluster centre 1050 of the distribution 1030. The size of the solid black circle 1060 represents the amount of earth needed to be moved.

Figures 11A, 11B, 11C:
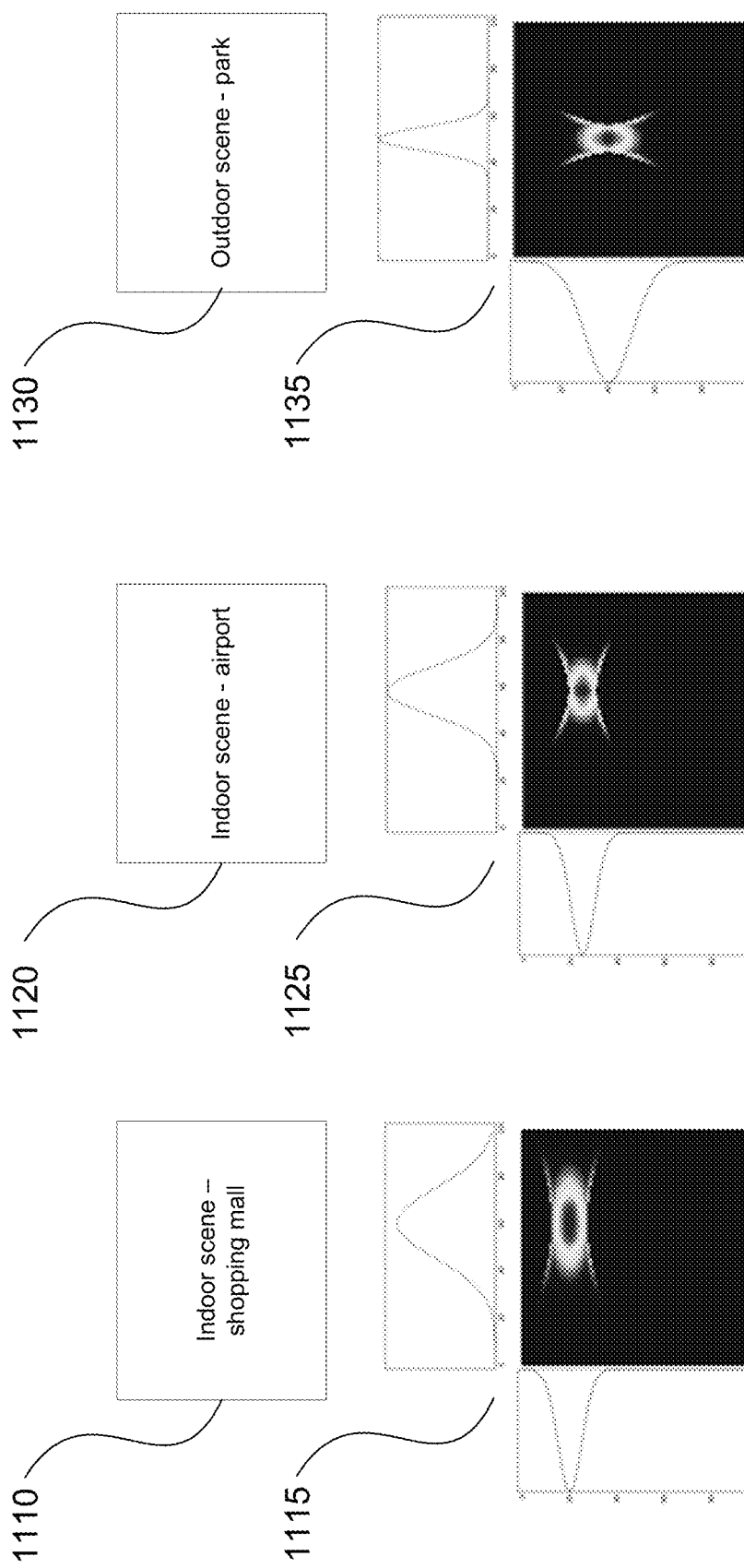
FIG. 11A shows an example of a coupling map of two cameras capturing two view points within an indoor scene of a shopping mall.
FIG. 11B shows a coupling map of two cameras in an indoor scene of an airport.
FIG. 11C shows a coupling map of two cameras in an outdoor scene of a park.

FIG. 11A shows an example of a coupling map 1115 of two cameras capturing two view points within an indoor scene of a shopping mall 1110. Similarly, FIG. 11B shows a coupling map 1125 of two cameras in an indoor scene of an airport 1120. Finally, FIG. 11C shows a coupling map 1135 of two cameras in an outdoor scene of a park 1130. As seen in FIGS. 11A, 11B and 11C, coupling maps 1115 and 1125 are similar to each other and both the coupling maps 1115 and 1125 are quite different from the coupling map 1135. Thus, the cross correlation of 1115 and 1125 as determined at step 550 of the method 500 is about 0.85, for example. In contrast, cross correlation of coupling map 1115 and coupling map 1135 as determined at step 550 of method 500 is 0.06, for example. The cross correlation value is directly related to how similar the domain of the airport 1120 is to the domain of shopping mall 1110 whereas domain of the park 1130 is dissimilar to domain of the shopping mall 1110. Hence, a person re-identification model 190 trained on a training dataset captured from cameras in a shopping mall 1110 is likely to be deployed to an airport 1120 without any update. However, a person re-identification model 190 trained on a training dataset captured from cameras in a shopping mall 1110 cannot be directly deployed to an outdoor scene of a park 1130. In such a case, steps 630 and 640 of the method 600 may be used to update the person re-identification Model 190 by collecting and training with data obtained from the outdoor scene of a park 1130.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method of performing person re-identification for images captured by at least two camera pairs operating with different environmental factors, the method comprising:
    clustering descriptors representing characteristics of objects corresponding to a person in the images of a first pair of cameras in a first domain;
    determining a first pair of probability distributions of the clustered descriptors;
    determining a first coupling map for the images of the first pair of cameras based on the first pair of probability distribution;
    clustering descriptors representing characteristics of objects corresponding to a person in the images of a second pair of cameras in a second domain;
    determining a second pair of probability distributions of the clustered descriptors;
    determining a second coupling map for the images of the second pair of cameras based on the second pair of probability distribution;
    determining a cross-correlation between the first and second coupling maps;
    determining a similarity between the first and second domains according to the determined cross-correlation; and
    determining whether person re-identification model is to be updated in accordance with the similarity.

2. The method according to claim 1, further comprising determining common cluster centres.

3. The method according to claim 1, wherein the descriptors are clustered using a K-Means clustering method.

4. The method according to claim 1, wherein clusters are determined in individual feature spaces.

5. The method according to claim 1, wherein clusters are determined in a common feature space.

6. The method according to claim 1, wherein the first and second pairs of probability distributions are histograms.

7. The method according to claim 1, wherein the coupling map represents the amount of earth moved between cluster centre of the distribution and cluster centre of the distribution.

8. The method according to claim 1, wherein the cross-correlation is determined based on a threshold.

9. The method according to claim 1, further comprising training a distance metric using the descriptors.

10. The method according to claim 9, wherein the distance metric is trained using a supervised learning method.

11. The method according to claim 9, wherein the distance metric is trained using an unsupervised learning method.

12. An apparatus for performing person re-identification for images captured by at least two camera pairs operating with different environmental factors, the apparatus comprising:
   means for clustering descriptors representing characteristics of objects corresponding to a person in the images of a first pair of cameras in a first domain;
   means for determining a first pair of probability distributions of the clustered descriptors;
   means for determining a first coupling map for the images of the first pair of cameras based on the first pair of probability distribution;
   means for clustering descriptors representing characteristics of objects corresponding to a person in the images of a second pair of cameras in a second domain;
   means for determining a second pair of probability distributions of the clustered descriptors;
   means for determining a second coupling map for the images of the second pair of cameras based on the second pair of probability distribution;
   means for determining a cross-correlation between the first and second coupling maps;
   means for determining a similarity between the first and second domains according to the determined cross-correlation; and
   means for determining whether person re-identification model is to be updated in accordance with the similarity.

13. A system for performing person re-identification for images captured by at least two camera pairs operating with different environmental factors, the system comprising:
   a memory for storing data and a computer program;
   a processor coupled to the memory for executing the computer program, the computer program having instructions for:
      clustering descriptors representing characteristics of objects corresponding to a person in the images of a first pair of cameras in a first domain;
      determining a first pair of probability distributions of the clustered descriptors;
      determining a first coupling map for the images of the first pair of cameras based on the first pair of probability distribution;
      clustering descriptors representing characteristics of objects corresponding to a person in the images of a second pair of cameras in a second domain;
      determining a second pair of probability distributions of the clustered descriptors;
      determining a second coupling map for the images of the second pair of cameras based on the second pair of probability distribution;
      determining a cross-correlation between the first and second coupling maps;
      determining a similarity between the first and second domain according to the determined cross-correlation; and
      determining whether person re-identification model is to be updated in accordance with the similarity.

14. A non-transitory computer readable medium having stored on the medium a computer program for performing person re-identification for images captured by at least two camera pairs operating with different environmental factors, the program comprising: code for clustering descriptors representing characteristics of objects corresponding to a person in the images of a first pair of cameras in a first domain; code for determining a first pair of probability distributions of the clustered descriptors; code for determining a first coupling map for the images of the first pair of cameras based on the first pair of probability distribution; code for clustering descriptors representing characteristics of objects corresponding to a person in the images of a second pair of cameras in a second domain; code for determining a second pair of probability distributions of the clustered descriptors; code for determining a second coupling map for the images of the second pair of cameras based on the second pair of probability distribution; code for determining a cross-correlation between the first and second coupling maps; code for determining a similarity between the first and second domains according to the determined cross-correlation; and code for determining whether person re-identification model is to be updated in accordance with the similarity.

* * * * *